United States Patent [19]

Wiley

[11] 3,959,432
[45] May 25, 1976

[54] COEXTRUSION PROCESS
[75] Inventor: Donald F. Wiley, Big Spring, Tex.
[73] Assignee: Cosden Oil & Chemical Company, Big Spring, Tex.
[22] Filed: Jan. 24, 1973
[21] Appl. No.: 326,241

[52] U.S. Cl. ............................. 264/171; 156/244; 264/176 R; 425/133.5; 428/412; 428/500
[51] Int. Cl.² ..................... B32B 27/28; B32B 27/08
[58] Field of Search ............... 264/171, 173, 176 R; 161/164, 165, 183; 156/244; 425/133.5; 428/412, 500

[56] References Cited
UNITED STATES PATENTS

| | | | |
|---|---|---|---|
| 2,815,308 | 12/1957 | Robinson et al. | 264/171 |
| 3,331,900 | 7/1967 | Thomas | 264/47 |
| 3,432,588 | 3/1969 | Breidt, Jr. et al. | 264/171 |
| 3,476,627 | 11/1969 | Squires | 156/244 |
| 3,565,737 | 2/1971 | LeFevre et al. | 156/244 |
| 3,565,985 | 2/1971 | Schrenk et al. | 264/171 |
| 3,589,976 | 6/1971 | Erb | 156/244 |

OTHER PUBLICATIONS
Flat–Die Coextrusion, Thomka et al., *Modern Plastics*, Apr., 1972, pp. 62–63.

*Primary Examiner*—Jeffery R. Thurlow

[57] ABSTRACT

A process for the manufacture of composite sheeting having a layer of polystyrene and at least one layer of polycarbonate polymer firmly united thereto, comprising joining a molten stream of each of said polymeric materials in a conduit to form a single stratified stream of molten material conforming to the cross-section of said conduit and having a relatively sharply defined interface between said polymeric materials, and passing said stratified stream of molten material through a sheet-form extrusion die having its die lips generally aligned with said interface between the two polymeric materials.

6 Claims, 4 Drawing Figures

COEXTRUSION PROCESS

BACKGROUND OF THE INVENTION

This invention relates to the production of multiple layer sheeting. More particularly, the present invention relates to the extrusion of plastic sheeting having a thin surface veneer of a second plastic material on at least one side thereof and to the compositions thereby produced.

Due to the particular properties of the many plastics, certain plastics are required for certain specific end applications and other plastics cannot be used in such applications. In many instances, due to this requirement of certain specific properties for particular applications, the cost of the plastic material is rather high as compared to similar plastics having somewhat different properties.

Within recent years, considerable effort has been made to find means of reducing the cost of these specialized plastics without an attendant loss of the properties which have made the plastics suitable for the particular uses in which they are employed. Among the means explored have been lamination or coextrusion together of different plastics to produce a composite. These techniques have in common the bringing together in layered form, sheets of two or more different plastic materials. In such manner, composite sheets may be produced having surface and other characteristics of the desired speciality plastic and yet by using a much cheaper substrate than the superstrate speciality plastic, the costs of the plastic sheet can be materially lowered.

In lamination, two or more previously extruded sheets of different plastics are brought together under pressure and temperature conditions or in the presence of adhesives in order to obtain adherence of the different plastic sheets to one another. This technique of forming composite sheets has a disadvantage of little flexibility in sheet thicknesses, requirement of extra extrusion equipment such as two or more regular extruders with attendant dies, rollers, sheet line, etc. Additionally, without the use of adhesives, adherence of the layers to one another is frequently unsatisfactory.

Coextrusion offers the least expensive means of preparing layered composite sheets of different plastics. Within coextrusion, two different techniques are most often employed. In one of these techniques, two or more plastic sheets are extruded from separate extruders through separate sheet dies into contact with one another while still hot and then passed through a single set of rollers or another extrusion die and down a single sheet line. Employing this technique, equipment requirements are still relatively large and there is still little flexibility and adherence is still quite frequently a problem with many plastics. The other coextrusion technique employs an adaptor or other means of bringing two or more different plastic materials from two or more extruders into contact with one another prior to their passage through an extrusion die. Generally, the known coextrusion processes using this technique have employed some form of encapsulation technique wherein one stream of thermoplastic material, typically the volumetrically smaller stream, is completely surrounded, e.g., coaxially, by a second stream of a different plastic material prior to passing the entire composite stream through an extrusion die. Alternatively, such incapsulations may be effected in the cavity portion of the extrusion die itself. In either instance, however, the resulting sheet product is characterized by an inner layer of one type of plastic material sandwiched between or encapsulated by two exterior layers of a second plastic material.

One of the major problems in coextrusion wherein the plastics to be coextruded are brought into contact with one another prior to passing through a die, has been the determination of conditions and means for bringing together components in a manner such as to produce upon extrusion through a sheet die, uniform layers while still obtaining the desired adherence of the plastic materials to one another. Additionally, prior coextrusion processes of this type have had limitations as to the relative thicknesses of the layers, requiring the minor or superstrate layer to represent at least 25% of the total volume of the composition.

It is now an object of the present invention to provide a new and improved process for coextrusion of a multiple layered sheeting.

Another object of the present invention is to provide a new and improved process for the coextrusion of two or more plastic materials into a composite sheeting whereby one or more of the layers may be very thin, representing less than 25 volume percent of the total composite.

A further object of the present invention is to provide a method of coextruding polystyrene and polycarbonates.

A remaining object of the present invention is to provide a new and novel plastic composition having at least two layers of thermoplastic material, at least two of said plastic materials being polystyrene and polycarbonate and being in contact with one another.

Additional objects will become apparent from the following description of the invention herein disclosed.

SUMMARY OF THE INVENTION

The present invention, which accomplishes these and other objects, in one of its embodiments is a process for producing composite sheeting having a major thickness of a first thermoplastic material and having a relatively thin protective layer of a second thermoplastic material. This process comprises combining in a conduit a first major extruded stream of molten polystyrene and a second minor extruded stream of a polycarbonate to provide a composite stratified stream conforming to the cross section of the conduit and having adjacent layers extending longitudinally of the stream, with adjacent layers having a relatively sharply defined interface therebetween. The composite streams are thereafter passed through a sheet forming extrusion die having its die lips generally aligned with the aforementioned interface. In this process, the relative proportion of the polycarbonate forming the minor layer of the coextruded sheeting comprises less than about 25% by volume based upon the total thermoplastic material coextruded.

In another embodiment of the present invention, a composition is provided, said composition comprising a layered composite of at least two adjacent layers comprising a major and minor layer, said major layer being polystyrene and said minor layer being a polycarbonate. The major and minor layers are adhered to one another at the interface therebetween. Additional plastic materials may be adhered or coated upon the outer surfaces of said polystyrene and said polycarbonate.

DESCRIPTION OF THE PREFERRED EMBODIMENTS OF THE PRESENT INVENTION

Figure 1:
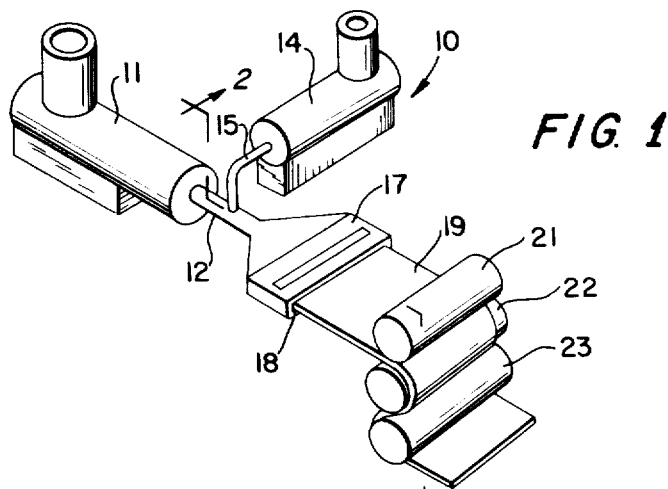
FIG. 1 of the drawings schematically represents an apparatus for the preparation of a multiple-layered sheet or film employing the method of the present invention.

In accordance with the present invention, it has been found that a multiple layered sheet or film may be produced from two polymeric materials which have hitherto not been successfully united by conventional techniques. Specifically, the sheeting or film of the present invention consists of a layer of polystyrene having a thickness substantially corresponding to the final composite sheeting thickness desired, and adhered to either one or both sides of the polystyrene layer, a layer or layers of a polycarbonate resin. Therefore, there is provided a composite sheeting having the desirable economic characteristics of polystyrene and concurrently possessing the highly desirable surface and structural properties of polycarbonate resins. Such composite materials characterized by the desirable surface and structural properties of the polycarbonates are well suited for the fabrication of various appliances and in aircraft and automotive applications such as finish items, bumpers, headlight bezels, fender extensions and the like, and in various sports equipment and recreational vehicles such as football, baseball, motorcycle and snowmobile helmets, hoods, consoles, backrests, clutch guards and the like.

The term polystyrene, as employed herein, includes both homopolymers of styrene and copolymers of styrene with other polymerizable and polymerized monomers. Included within the latter category are impact polystyrenes which comprise graft copolymers of styrene with conjugated diene backbone polymers such as polybutadiene, butadiene-styrene copolymers, butadiene-acrylonitrile copolymers, natural rubber, and the like. Also included in this category are normal copolymers of styrene with other well-known conventional monomers.

The polycarbonate resins useful are those having the structural formula

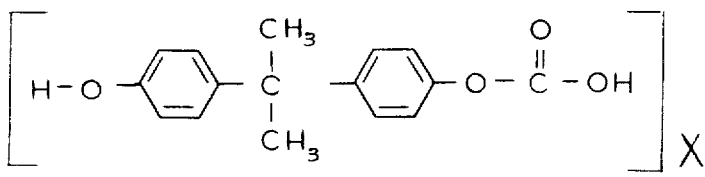

where X is 100 to 400 units. Such polycarbonate resins are formed by the reaction of phosgene and bis phenol A. These polycarbonate resins possess uncommonly high impact strength, not only at temperatures up to 280°F, but also at temperatures as low as minus 100°F. Additionally, the polycarbonate natural resins have water-clear transparency. Also, the polycarbonate resins possess a wide temperature range at which their properties remain useful. Polycarbonate performs well down to minus 100°F and displays heat distortion temperatures above 280°F at 264 psi. loading. These resins have a very predictable and low shrinkage characteristic and polycarbonate exhibits very little creep. A particularly useful group of polycarbonate resins are marketed by General Electric under the trade name "Lexan".

The present extrusion process has been found operable to produce multi-layered sheeting having extremely thin surface layers of polycarbonate, e. g., on the order of 1 mil. or less, in comparison to the total sheet thickness, e. g., 10 to 12 mils. This is achieved by providing relative feed rates of the polystyrene to the polycarbonates such that the volume of polycarbonates generally does not exceed about 25%, and preferably is less than about 20% of the total resin feed. Relative feed rates for the polycarbonates of less than about 15% of the total resin feed are, typically, preferred even more.

The principles of the present invention generally are applicable to the manufacture of either multi-layer polymeric "film" (less than 10 mils. in thickness) or "sheeting" (10 mils. or thicker). However, polystyrene based film has not found widespread popularity because of the difficulties encountered in adapting this material to blown film apparatus conventionally employed together with extrusion equipment in the manufacture of film products. Therefore, while it is possible to produce a composite film having a 1 mil. or thinner surface layer of polycarbonate on a 4 or 5 mil., or even a 1 mil. base layer of polystyrene, practically speaking, the products of most interest are multi-layer sheets of from 10 mils. up to ⅜ inch in thickness having polycarbonate resin surface layers measuring from a fraction, e. g., ¼ to ½ mil. to several mils. Accordingly, it will be appreciated that the volumetric feed rates for the polycarbonate component are frequently very small, e. g., less than 1%, when thicker sheeting is desired, and likewise that rates in excess of 20% or 25% are contemplated when very thin film is produced.

Referring now to the drawings, in FIG. 1 there is schematically illustrated an apparatus, generally designated by the reference numeral 10, particularly adapted for the process of the present invention. The apparatus 10 comprises in cooperative combination a first extruder 11 for the extrusion of molten polystyrene, and connected thereto, a discharge conduit 12. A second extruder 14 having a discharge conduit 15 is adapted for providing a minor stream of molten polycarbonate resin. Conduit 15 terminates at conduit 12 at a point upstream of the sheeting die 17 which is in operative communication with conduit 12 and receives the flow therefrom. Sheet 19 is formed at the die lips 18 and thereafter carried from the die by means of polished cooling rollers 21, 22 and 23.

Figure 2:
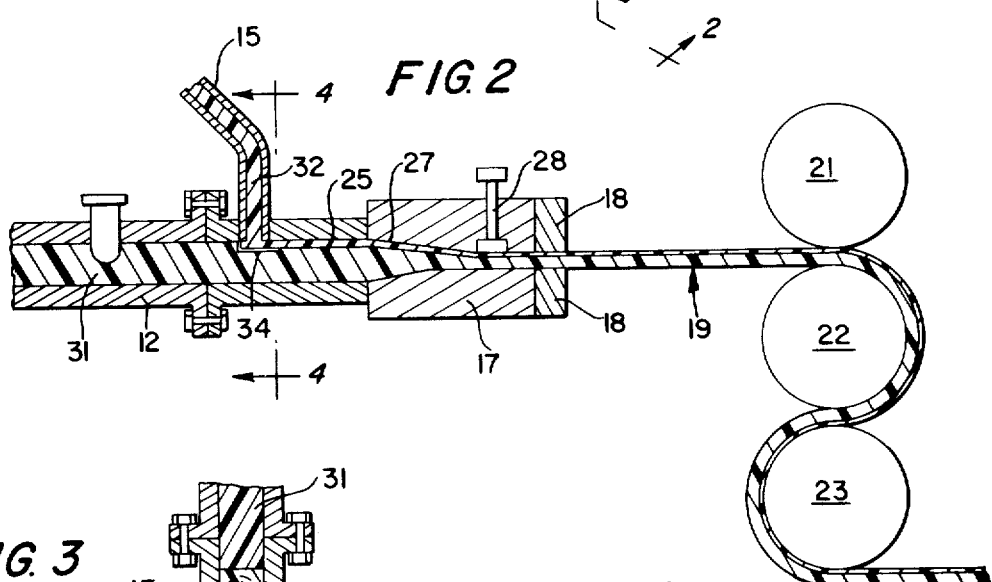
FIG. 2 of the drawings is a cross sectional view taken along the line 2—2 in FIG. 1.

In FIG. 2 there is illustrated a sectional view of the discharge conduits 12 and 15, extrusion die 17 and cooling roller arrangement 21, 22 and 23. This view illustrates the intersection of conduits 12 and 15, and the configuration of the polystyrene resin 31 and polycarbonate resin 32 as they are combined in conduit 12 to form a stratified stream having an interfacial juncture plane 25. Stratification at the intersection point of the two resins is aided by metal plate 34 positioned in conduit 12 adjacent the entry point of coextruder discharge conduit 15. Similarly, there is illustrated the passage of the stratified resin stream into the die manifold 27, past restricter bar 28 and ultimately through the extruder die lips 18 to the chrome or cooling roller assembly. Throughout this entire traversal of the extrusion equipment, it is noted that the individual layers of resinous material maintain their stratified relationship, despite the minute proportion of polycarbonate, to form a final product having an essentially uniform surface layer of this material.

Figure 3:
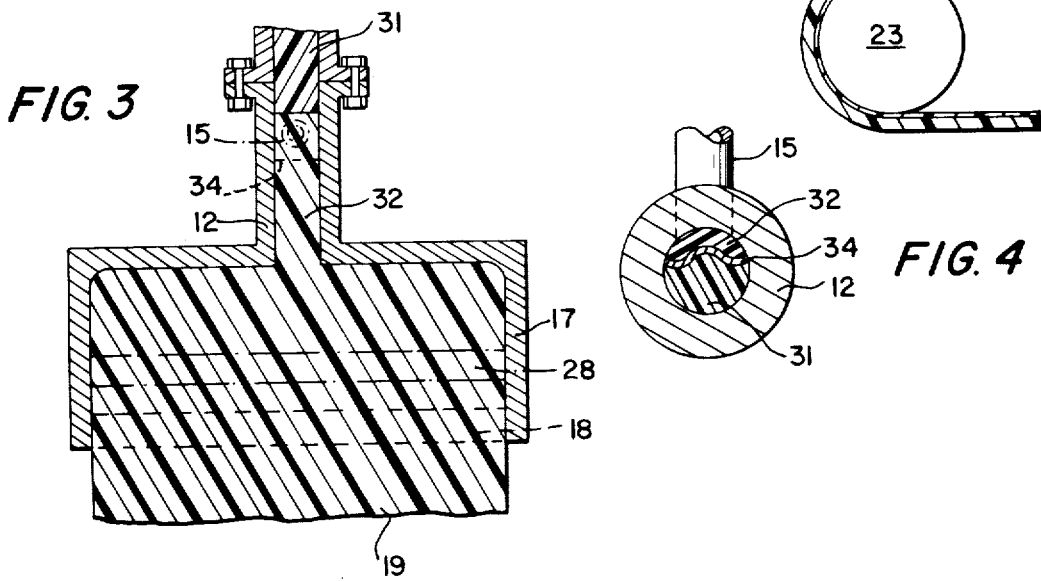
FIG. 3 of the drawings is a top view, in section, of the extrusion die and lead end conduit portion of the apparatus illustrated in FIG. 1.
Figure 4:
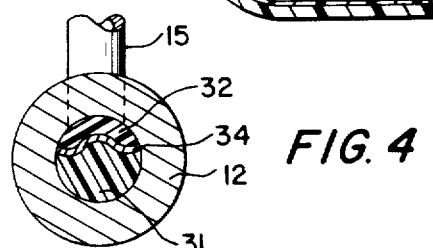
FIG. 4 of the drawings is a cross sectional view taken along the line 4—4 in FIG. 2.

In FIG. 3 is illustrated a top view of the conduit 12 and extrusion die 17 to demonstrate the lateral flow pattern of molten polymeric material as it passes into and through the extrusion die. FIG. 4 illustrates more clearly the preferred configuration of metal plate 34 positioned in conduit 12.

To produce a multi-layered sheet or film having a satisfactory degree of adherence between layers, it is necessary to observe certain process limitations during the extrusion procedure. While it is of course desirable to provide relatively steady flow of polystyrene and polycarbonate resin through the apparatus and to avoid any turbulence therein, these limitations are rather typical in most extrusion processes employing highly viscous synthetic resins. More important limitations (although not wholly unrelated to the foregoing) reside in the extrusion temperatures for the polystyrene and polycarbonate, and the temperature maintained in the extrusion die. The extrusion of the polystyrene from extruder 11 into conduit 12 should be carried out at a temperature of from about 350°F to about 500°F, preferably 360°F to 450°F, whereas the polycarbonate should be discharged from extruder 14 at a temperature of from about 550°F to about 600°F. This range is not intended to be an absolute limitation on the invention, but rather indicates only the median range wherein the melt viscosity of the polycarbonate resin may be rendered proximate to the melt viscosity of polystyrene so as to provide strong adherence between layers in the extruded sheet. It is to be understood that the invention would likewise embody within its scope the use of polycarbonate resins which might be extruded at even higher temperatures to produce satisfactory adherence to the polystyrene substrate co-extrudate.

As indicated, die temperature also is an important process variable. This parameter particularly affects the surface characteristics, e.g., gloss, surface smoothness, etc., of the extruded sheet. Die temperatures should be maintained relatively constant during extrusion, with typical values thereof for coextrusion of polycarbonate and polystyrene ranging between about 460° and 490°F. The best characteristics are attained with temperatures above about 480°F.

In the coextrusion of polystyrene and polycarbonate the conditions maintained at the cooling roller assembly also affect the properties of the final product. The manufacture of smooth sheeting normally requires the use of highly polished rollers, e.g., chrome, typically three in number, each being approximately 12 inches in diameter and being adapted for internal circulation of cooling water. When polycarbonate is coextruded as a surface layer, however, it has been found that a slightly higher than normal top roll temperature, e.g., 265°F, as well as a lower than normal top roll pressure, e.g., approximately enough to overcome upward spring tension on the rollers, are required to achieve optimum characteristics.

Other processing variables of lesser importance include the pressures at which the polystyrene and polycarbonate are separately extruded before combination. These pressures typically fall within the range of 1900 and 2100 p.s.i. for the polycarbonate stream. Of course, the downstream pressure at the point where the streams intersect is equal in both streams.

EXAMPLE

A main resin stream of impact polystyrene (Cosden Oil & Chemical Co. 825D pellets) is extruded from a 4½ inch diameter two stage vented extruder containing a 4:1 compression ratio screw. A 1¼ inch diameter 24:1 single stage side extruder also having a 4:1 compression ratio screw is arranged as illustrated in FIGS. 1 and 2 and supplies a second stream of a medium viscosity polycarbonate resin marketed by General Electric as Lexan 103, having a specific gravity at 73°F of 1.2, heat defection temperature at 264 p.s.i. of 270°F. The polystyrene is extruded at a temperature of 450°F. and a feed rate of approximately lbs./hr. The polycarbonate side stream is discharged from the 1¼ inch extruder at 550°F. and at a feed rate of approximately 18 lbs./hr.

The two resinous streams are then combined in the discharge conduit of the 4½ diameter extruder utilizing a baffle plate arrangement illustrated in FIG. 4. There results a single stratified bi-component stream having a horizontal juncture plane between the polystyrene and polycarbonate. The bi-component stream is conducted to a center-fed sheet-form extrusion die which opens to an extrusion slit 37 inches wide with its lips set at approximately 59 mils. The die temperature averaged about 460°– 465°F.

Upon leaving the die lips, the extruded sheet passes through a series of three 12 inch polished chrome cooling rolls, the top roll maintained at 265°F., middle roll at 170°F. and bottom roll at 140°F. Roll pressures were maintained at about 80 p.s.i. for top roll, 70 p.s.i. for middle roll and 40 p.s.i. for bottom roll. The roll gap setting was 55 mils. The polishing and subsequent rubber rolls are operated at about 10% and 8%, respectively, excess speed to stretch the extruded sheet to a final thickness of 55 mils.

Examination of the final sheeting product evidences an essentially uniform layer of polycarbonate approximately mils thick firmly adhered to the impact polystyrene base layer. This thickness corresponds closely with the relative feed rates for the two resins.

Thus, there has been provided according to the invention a process for co-extruding multi-layered sheeting of polystyrene and polycarbonate wherein at least one polycarbonate layer is firmly adhered to the polystyrene base layer. Moreover, the subject process enables the production of multi-layered film or sheeting of polystyrene having very thin, e.g., less than 1 mil, surface layers of polycarbonate.

While the fundamental novel features and advantages of the invention have been pointed out in connection with a single illustrated embodiment thereof, it will be appreciated that various obvious modifications of the co-extrusion process will suggest themselves to one of ordinary skill in the art. Therefore, it is intended to be limited only by the scope of the following claims.

What is claimed is:

1. A process for the manufacture of composite sheeting having a major base layer of polystyrene and at least one relatively thin surface layer of polycarbonate polymer adhered thereto, comprising extruding a heat plastified stream of polystyrene at a temperature of from about 360°F. to about 450°F., extruding a heat plastified stream of polycarbonate polymer at a temperature of from about 550°F. to about 600°F., conveying said heat plastified stream of styrene polymer in a conduit having a generally circular cross-section, joining to the exterior surface of said styrene polymer stream within said conduit said heat plastified stream of polycarbonate polymer, thereby forming a single stratified stream of heat plastified materials conforming to the cross-section of said conduit and being characterized by distinct, contiguous layers of said two polymeric materials having a relatively sharply defined interface therebetween, said interface terminating at each end at a point on the inside surface of said conduit, the relative volumetric proportion of the polycarbonate polymer in said stratified stream being less than about 20% based upon the total polymeric material, and passing said stratified stream of heat plastified material through a sheet-form extrusion die, said die having a die orifice width substantially greater than the diameter of said conduit and having its die lips generally transversely aligned with said interface between the two polymeric materials.

2. The process as defined by claim 1, wherein the relative volumetric portion of the polycarbonate polymer is less than about 15% based upon the total polymeric material.

3. The process as defined by claim 1 wherein the extrusion die is maintained at a temperature of from about 460°F. to about 490°F.

4. The process as defined by claim 1, wherein said polystyrene is a homopolymer of styrene.

5. The process as defined by claim 1, wherein said polystyrene is impact polystyrene.

6. The process as defined by claim 1, wherein said polycarbonate is a polymer having the structural formula

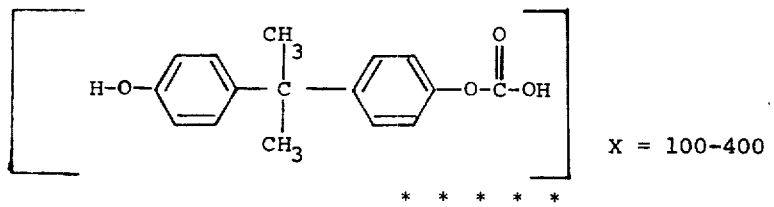

* * * * *